United States Patent [19]

Koos

[11] 4,400,794
[45] Aug. 23, 1983

[54] MEMORY MAPPING UNIT

[75] Inventor: Larry W. Koos, Orlando, Fla.

[73] Assignee: Burroughs Corporation, Detroit, Mich.

[21] Appl. No.: 322,118

[22] Filed: Nov. 17, 1981

[51] Int. Cl.³ .............. G06F 13/00; G11C 5/06; G11C 7/00
[52] U.S. Cl. ........................... 364/900; 365/63
[58] Field of Search ... 364/200 MS File, 900 MS File; 365/63

[56] References Cited

U.S. PATENT DOCUMENTS

| 4,025,903 | 5/1977 | Kaufman et al. | 364/200 |
| 4,121,286 | 10/1978 | Venton et al. | 364/200 |
| 4,189,767 | 2/1980 | Ahuja | 364/200 |
| 4,330,825 | 5/1982 | Girard | 365/63 |

Primary Examiner—Eddie P. Chan
Attorney, Agent, or Firm—D. G. Rasmussen; K. R. Peterson; E. M. Chung

[57] ABSTRACT

A memory mapping unit enables different sized memory boards to be mapped in any order into any size memory address boundary in a microprocessor. Any $2^K$ sized memory board (where $N \leq K \leq M$) can be mapped to any $2^N$ address boundary. To accomplish this, a binary adder adds the 2's complement of the base address register with significant bits from the address buss. A series of logic gates are connected to the output of the binary adder and a board size mask register. The logic gates perform an "AND" operation on the output from the binary adder and the board size mask register. The outputs from the logic gates connect to a multiple input "NOR" gate. When all the inputs are logical "zero", indicating the address is on the board, a board enable command is produced which activates the memory board transceiver.

5 Claims, 4 Drawing Figures

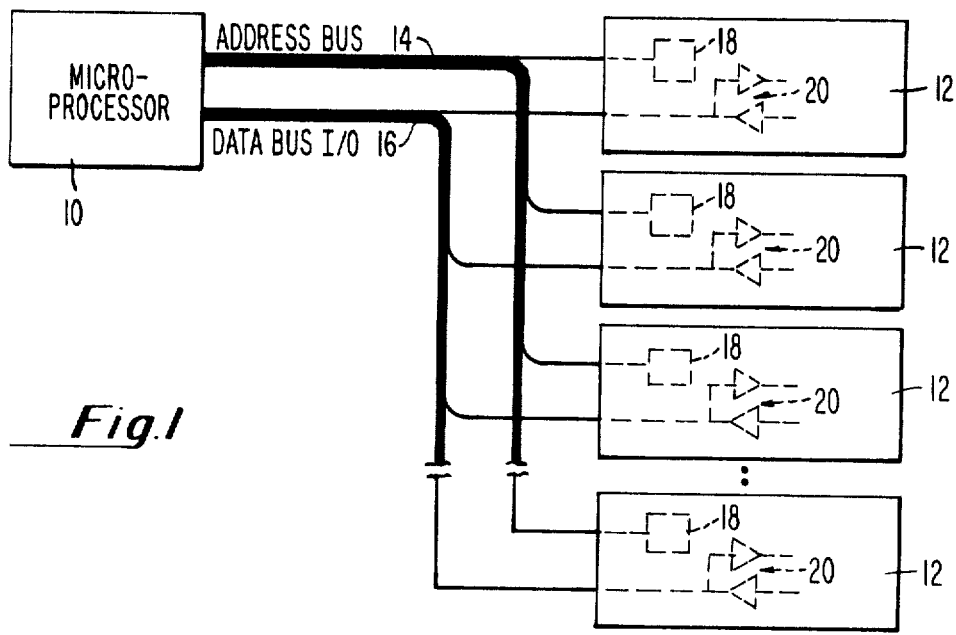
*Fig.1*
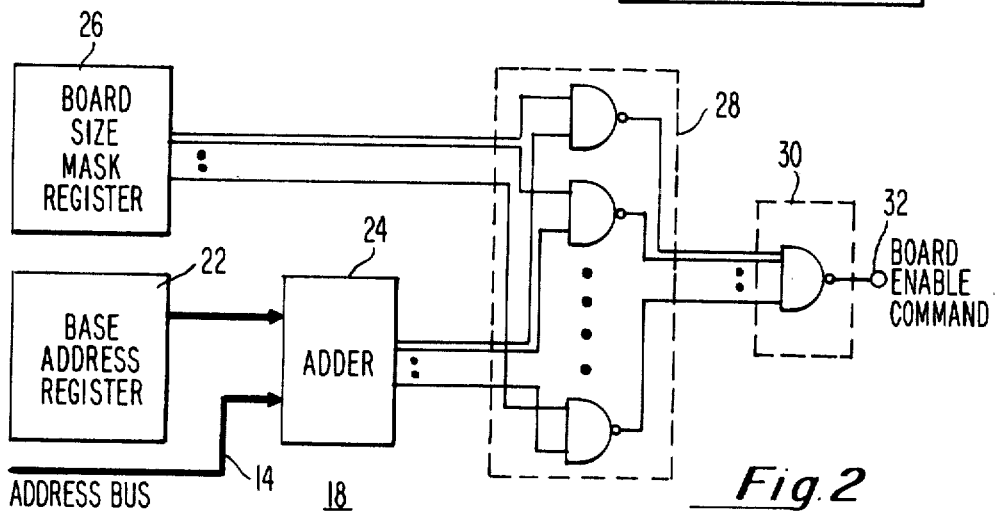
*Fig.2*
| BOARD SIZE | MASK BITS | | | | | | | |
|---|---|---|---|---|---|---|---|---|
| 8 K   | 1 | 1 | 1 | 1 | 1 | 1 | 1 | 1 |
| 16 K  | 1 | 1 | 1 | 1 | 1 | 1 | 1 | 0 |
| 32 K  | 1 | 1 | 1 | 1 | 1 | 1 | 0 | 0 |
| 64 K  | 1 | 1 | 1 | 1 | 1 | 0 | 0 | 0 |
| 128 K | 1 | 1 | 1 | 1 | 0 | 0 | 0 | 0 |
| 256 K | 1 | 1 | 1 | 0 | 0 | 0 | 0 | 0 |
| 512 K | 1 | 1 | 0 | 0 | 0 | 0 | 0 | 0 |
| 1 M   | 1 | 0 | 0 | 0 | 0 | 0 | 0 | 0 |
*Fig.4*

MEMORY MAPPING UNIT

BACKGROUND OF THE INVENTION

1. Field of the Invention

The invention relates to a Memory Mapping Unit for engaging one of a series of memory boards associated with a microprocessor. More particularly, the invention enables different sized memory boards to be mapped in any order into any size memory address boundary.

2. Description of the Prior Art

It is generally known in the art, to have a series of memory boards feeding off of a common address buss and a common data buss. The address buss indicates the memory address location being accessed by the microprocessor. Each board contains a data buss transceiver which allows the microprocessor to read or write into memory locations on that board. Since simultaneous activation of several transceivers will result in their burn-out, a Memory Mapping Unit is used to activate only the transceiver associated with the board containing the memory address location being accessed. Prior art memory mapping units were limited in application and could handle only certain sized memory boards, which had to be arranged in descending order of size for a given memory boundary.

SUMMARY OF THE INVENTION

The current invention corrects deficiencies in prior art memory mapping units, thus allowing for greater versatility in system design. With the invented memory mapping unit, any $2^K$ sized memory board (where $N \leq K \leq M$) can be mapped to any $2^N$ address boundary. (The address boundary size, $2^N$, sets the lower limit of board sizes; the total memory space, $2^M$, sets the upper limit of board sizes.) The system is also unique in that the various sized memory boards can be arranged in any order in the memory system.

To accomplish this result, the present invention contains a binary adder which adds the 2's complement of the base address register with significant bits from the address buss. A series of logic gates are connected to the output of the binary adder and a board size mask register. (The value loaded in the board size mask register is chosen to mask out insignificant bits not needed for a particular board size.) The logic gates perform an "AND" operation on the output from the binary adder and the board size mask register. The outputs from the logic gates connect to a multiple input "NOR" gate. When all the inputs are logical "zero", indicating the address is on the board, a board enable command is produced which activates the memory board transceiver.

BRIEF DESCRIPTION OF THE DRAWINGS

FIG. 1 is a system diagram showing a microprocessor and associated memory boards.

FIG. 2 is a generalized block diagram of the memory mapping unit.

FIG. 4 is a table showing masked bits for a given board size for a $2^{21}$ byte memory space.

DETAILED DESCRIPTION OF THE PREFERRED EMBODIMENT

Figure 3:
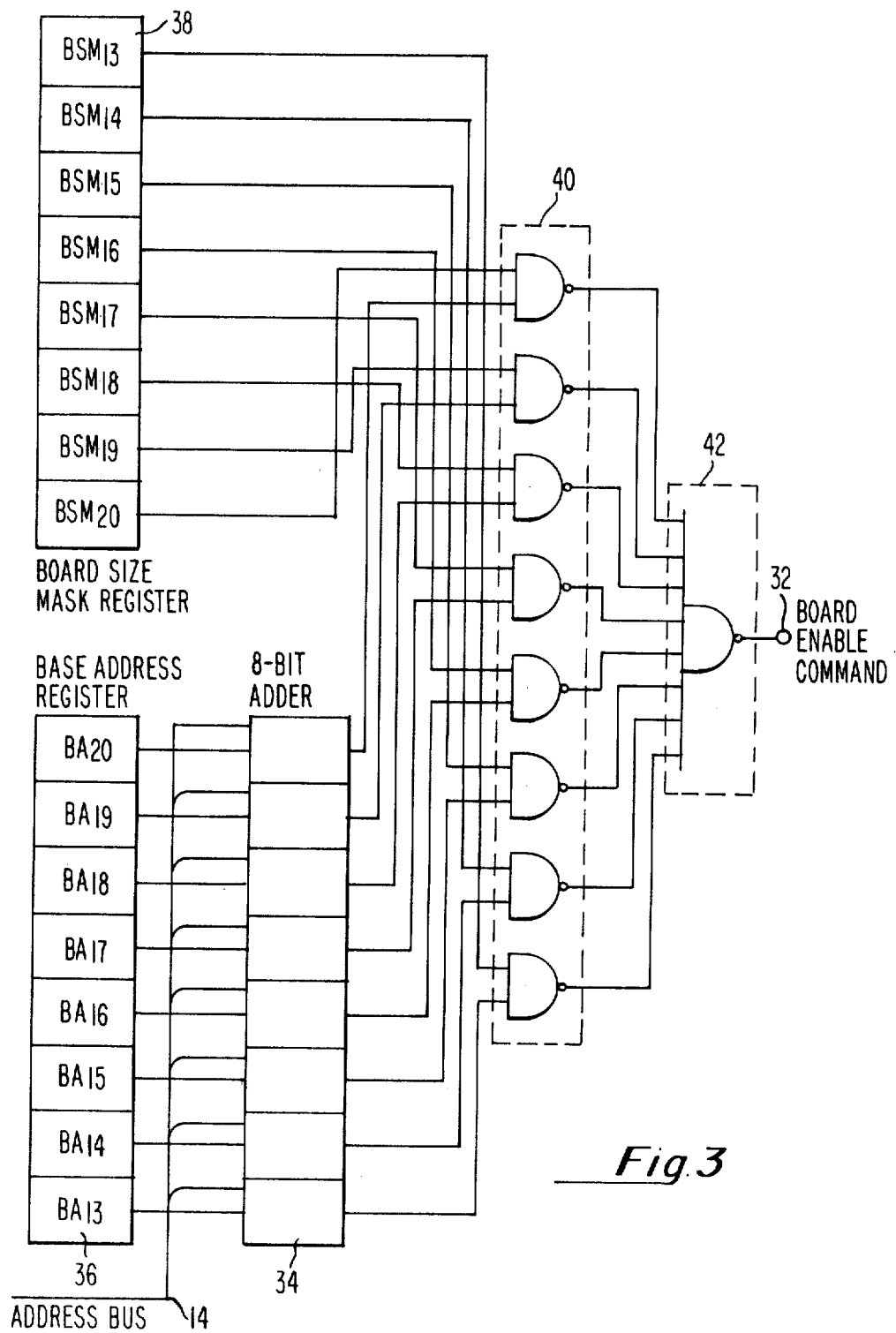
FIG. 3 is a functional block diagram of a memory mapping unit for a $2^{21}$ byte memory space.

A system diagram, showing a microprocessor and it's associated memory boards, is illustrated in FIG. 1. Generally, the microprocessor 10 connectes to a series of memory boards 12 through a common address buss 14 and data buss 16. A memory mapping unit 18 is connected to the address buss 14 and is associated with each memory board 12. When the address received over the address buss 14 identifies a memory location which is on a particular board, the memory mapping unit 18 for that board sends a board enable command, which turns on the board transceiver 20. Once the board is enabled and the board 20 is turned-on, the board can either receive or transmit data over the data buss 16.

A generalized block diagram of the memory mapping unit is shown in FIG. 2. The apparatus is composed of: a base address register 22 which stores the 2's complement of the base address for the particular memory board; a binary adder 24 which connects to the base address register 22 and the address buss 14, and adds the 2's complement of the base address with significant bits from the current memory address; a board size mask register 26 for storing masking bits; a plurality of AND gates 28, each gate connects to one bit from the board size masking register 26 and a corresponding bit from the adder 24 output, so that the bits not required for the particular board size are masked; and, NOR gate 30 which connects to each of the plurality of AND gates 28 will produce a board enable command 32 if it's inputs are all "zero".

Adding the 2's complement of the base address with the address currently on the buss is the same as subtracting the base address from the current address location. This operation is performed by the base address register 22 and the adder 24. By checking the M−K most significant bits of the addition for overflow (i.e. a "one" occurring in one of the M−K most significant bits), a board enable is generated. A masking operation is used to eliminate bits which are not useful for a particular board size. The board size mask register 26 and a plurality of AND gates 28 provides this operation. If after the masking operation, a "one" appears, the address is not on the board; if, however, all "zeros" appear, the address is located on the board and NOR gate 30 produces a board enable command 32.

The actual configuration of the circuit depends on the size of the memory space and the side of the smallest memory board being used. If the total memory space contains $2^M$ locations, and the smallest memory board contains $2^N$ locations, then (M−N) bits will be required to map any $2^K$ ($N \leq K \leq M$) sized memory board into any $2^N$ address boundary. Therefore, the board size mask register 26 and the base address register 22 will contain (M−N) bits. The adder 24 will be a (M−N) bit adder and will add the bits from the address buss 14. There will be (M−N) AND gates 28 to mask the output of the board size mask register 26 with the output of the adder 24, and NOR gate 30 will have (M−N) input ports.

The (M−N) bits stored in the board size mask register 26 are used to mask insignificant bits. For a board size of $2^K$ locations, the first (K−N) least significant bits loaded in the register should be "zero" and the upper (M−K) bits should be "one".

The generalized configuration discussed above is designed to use the least amount of components of the fewest number of significant bits during calculation. However, other configurations incorporating the basic teaching could be designed. One could, for instance, use more bits from the address buss and reconfigure the board size masking function.

FIG. 3 shows the functional block diagram of a memory mapping unit designed specifically for a $2^M$ location memory space and a $2^N$ smallest memory board, where $M=21$ and $N=13$. The upper 8 significant bits from (Note $M-N=21-13=8$ bits) the address buss 14 are summed by the 8 bit adder with the 8 bit base address as loaded in the base address register 36 by software. The 8 mask bits are software loaded in the board size mask register 38. (FIG. 4 tabulates the mask bits to be stored in the board size mask register for a particular board size) Eight AND gates 40 are connected to the output of the 8 bit adder 34 and the board size mask register 36; each AND gate connects to one bit of register 38 and a corresponding bit from adder 34. The output from the eight AND gates 40 inputs to NOR gate 42. Where all "zeroes" are presented to the NOR gate 42, a board enable command is generated.

For example, if the memory mapping unit is placed on a $2^{14}$ location memory board (in the art this is called a 16K byte memory board) and the base address for the board is (022000) in base 16; the 2's complement of the upper eight bits base address, which is $(11101111)^2$, is software loaded into the base address register 36; and, for a 16K board we can see from FIG. 4 that $(11111110)^2$ should be software loaded into the board size mask register. If $(026000)^{16}$ is the current address on the address buss, then:

| 2's comp. base address | 11101111 | |
|---|---|---|
| | | 8-bit ADD |
| current address | 00010011 | |
| | 00000010 | |
| | | 8-bit AND |
| board size mask | 11111110 | |
| | 00000010 | |

Since the inputs to the NOR gate will contain a "one", it's output will be "zero" and a board enable command will not be sent.

If however, $(025\ FFF)_{16}$ is the current address in the address buss 14, then:

| 2's comp. base address | 11101111 | |
|---|---|---|
| | | 8-bit ADD |
| current address | 00010010 | |
| | 00000001 | |
| | | 8-bit AND |
| board size mask | 11111110 | |
| | 00000000 | |

Since the input to the NOR gate 42 will contain only "zeros", it's output will be "one", the address is located on the board, and a board enable command 32 will be sent.

One advantage of the apparatus is that the memory mapping unit can map any $2^K$ size memory board ($K \leq N \leq M$) into any $2^N$ byte memory address boundary. For the particular design shown in FIG. 3, this allows for great design versatility, since any 8K, 16K, 32K, 64K, 128K, 512K, or 1M byte memory board can be mapped in any order, or any combination, to any $2^K$ memory boundary.

Another advantage is that it allows the memory system to be totally self-configurable. Since the base address register and board sized mask register are software loaded, all memory is dynamically relocated to any $2^N$ byte boundary regardless of the board size.

Another advantage is that software loading of the board size mask register allows the identically designed memory mapping unit to be placed on any size board. In the apparatus of FIG. 3 it allows the same memory mapping unit design to be placed on a 8K, 16K, 32K, 64K, 128K, 256K or 1M byte memory board.

Obviously, any modifications and variations of the present invention are possible in light of the above teachings. It is therefore to be understood, that within the scope of the appended claims, the invention may be practiced otherwise as specifically described.

What is claimed and desired to be secured by Letters of Patent of the United States is:

1. A memory mapping unit used to map a $2^K$ size memory board to any $2^N$ address boundary, for a $2^M$ memory space having a M bit address buss connected in parallel to each memory board, the $2^K$ memory board can range in size from $N \leq K \leq M$, each memory board mapping unit is associated with a particular memory board and produces a board enable command when the address carried by the address buss identifies the location on the memory board, comprising:
    a base address register containing at least (M − N) bits for storing the 2's complement of the base address of the memory board;
    an adding means connected to said base address register and the address buss for adding the value of the base address register with the upper (M − N) bits of the memory address;
    a board size mask register containing at least (M − N) bits for masking out bits which are not useful for a particular board size such that for a $2^K$ board, the first (K − N) least significant bits in said board size register should be "zero" and the upper (M − K) bits should be "one";
    a first logical means connected to said adding means and said board size mask register for performing an AND operation on each bit in said adding means with it's corresponding bit position in said board size mask register; and
    a second logical means connected to said first logical means for performing a NOR operation on the outputs from said first logical means and producing said board enable command when all of said outputs are in a predetermined logic condition, which turns on the memory board when the memory address identifier is located on the board.

2. The apparatus according to claim 1 in which said base address register and said board size mask register are software loaded.

3. The apparatus of claim 1 in which said first logical means contains (M − N) logic means each connected to one bit from said board size mask register and a corresponding bit from said adding means for performing an AND operation.

4. The apparatus of claim 1 in which said second logical means is a logic means for performing a NOR operation with (M − N) ports connected to each output of said first logical means.

5. A memory mapping unit is used to map any $2^K$ sized memory board to any $2^N$ address boundary, for a $2^M$ memory space having a M bit address buss connected in parallel to each memory board, the $2^K$ memory board can range in size from $N \leq K \leq M$, each memory mapping unit is associated with a particular memory board and produces a board enable command when the address carried by the address buss identifies the location on the memory board, comprising:

- a base address register containing (M−N) bits, which is software loaded, with the 2's complement base address of the memory board;
- a (M−N) bit adder connected to said base address register and the upper (M−N) bits of the address buss;
- a board sized mask register, which is software loaded with (M−N) bits, such that for a $2^K$ board, the first (K−N) least significant bits are "zero" and the upper (M−K) bits are "one";
- a plurality of (M−N) AND gates, each connected to one bit from said board size mask register and a corresponding bit from said (M−N) bit adder; and,
- a NOR gate connected to the output of each of said plurality of (M−N) AND circuits and producing as it's output said board enable command when all of said outputs of the AND circuits are in a predetermined logic condition.

* * * * *